(12) United States Patent
Yoshimine

(10) Patent No.: US 10,069,152 B2
(45) Date of Patent: Sep. 4, 2018

(54) FUEL CELL

(75) Inventor: Yuki Yoshimine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 448 days.

(21) Appl. No.: 13/575,079

(22) PCT Filed: Mar. 3, 2011

(86) PCT No.: PCT/JP2011/055560
§ 371 (c)(1),
(2), (4) Date: Jul. 25, 2012

(87) PCT Pub. No.: WO2011/114970
PCT Pub. Date: Sep. 22, 2011

(65) Prior Publication Data
US 2012/0301815 A1    Nov. 29, 2012

(30) Foreign Application Priority Data

Mar. 17, 2010    (JP) ................. 2010-061027

(51) Int. Cl.
*H01M 2/14*    (2006.01)
*H01M 8/00*    (2016.01)
(Continued)

(52) U.S. Cl.
CPC ..... *H01M 8/04089* (2013.01); *H01M 8/0247* (2013.01); *H01M 8/0258* (2013.01);
(Continued)

(58) Field of Classification Search
CPC ....... H01M 2008/1293; H01M 8/0247; H01M 8/04089; H01M 8/2425; Y02E 60/50; Y02E 60/525

See application file for complete search history.

(56) References Cited

U.S. PATENT DOCUMENTS 8,530,107 B2    9/2013    Ogawa et al.
2005/0136319 A1    6/2005    Tsunoda et al.
(Continued)

FOREIGN PATENT DOCUMENTS

JP    10-172594    6/1998
JP    2002-343407    11/2002
(Continued)

OTHER PUBLICATIONS

Japanese Office Action with partial English translation, dated Dec. 3, 2013, JP Application 2010-061027, 4 pages.
European Office Action dated Nov. 28, 2014, 6 pages.

*Primary Examiner* — Barbara L Gilliam
*Assistant Examiner* — Adam A Arciero
(74) *Attorney, Agent, or Firm* — Rankin, Hill & Clark LLP

(57) ABSTRACT

In a fuel cell, an electrolyte electrode assembly is sandwiched by a pair of separators, which include a sandwiching section having a fuel gas channel for supplying a fuel gas to an anode and a fuel gas inlet for supplying the fuel gas to the fuel gas channel, a bridge having a fuel gas supply channel for supplying the fuel gas to the fuel gas channel, and a fuel gas supply section having a fuel gas supply passage for supplying the fuel gas to the fuel gas supply channel. During operation of the fuel cell, a pressure loss P1 by the fuel gas in the fuel gas inlet, a pressure loss P2 by the fuel gas in the fuel gas supply channel, and a pressure loss P3 by the fuel gas in the fuel gas supply passage have the relationships of P1>P2 and P1>P3.

8 Claims, 12 Drawing Sheets

(51) Int. Cl.
  *H01M 8/04089*  (2016.01)
  *H01M 8/2457*  (2016.01)
  *H01M 8/2432*  (2016.01)
  *H01M 8/2483*  (2016.01)
  *H01M 8/0258*  (2016.01)
  *H01M 8/0247*  (2016.01)
  *H01M 8/2425*  (2016.01)
  *H01M 8/04082*  (2016.01)
  *H01M 8/124*  (2016.01)

(52) U.S. Cl.
  CPC ....... *H01M 8/2425* (2013.01); *H01M 8/2432* (2016.02); *H01M 8/2457* (2016.02); *H01M 8/2483* (2016.02); *H01M 8/04201* (2013.01); *H01M 2008/1293* (2013.01); *Y02E 60/50* (2013.01); *Y02E 60/525* (2013.01)

(56) References Cited

U.S. PATENT DOCUMENTS

2007/0178362 A1* 8/2007 Miyazaki ............ H01M 8/0256
  429/446
2009/0042081 A1  2/2009 Kotani et al.
2009/0130522 A1  5/2009 Akikusa et al.

FOREIGN PATENT DOCUMENTS

| JP | 2006-269409 | 10/2006 |
| JP | 2009-170375 | 7/2009 |
| WO | 2009/093622 | 7/2009 |

* cited by examiner

＃ FUEL CELL

TECHNICAL FIELD

The present invention relates to a fuel cell including an electrolyte electrode assembly and separators sandwiching the electrolyte electrode assembly. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, generally, predetermined numbers of the electrolyte electrode assemblies and the separators are stacked together to form a fuel cell stack.

In the fuel cell, in order to supply a fuel gas such as a hydrogen-containing gas and an oxygen-containing gas such as the air to the anode and the cathode of the electrolyte electrode assembly, a fuel gas channel and an oxygen-containing gas channel are formed along surfaces of the separator. The fuel cell stack may adopt internal manifold structure where a fuel gas supply passage extends through the fuel cell stack in the stacking direction for distributing the fuel gas to each fuel gas channel.

For example, in a solid oxide fuel cell disclosed in Japanese Laid-Open Patent Publication No. 2006-269409, as shown in FIG. 11, a manifold $2a$ extending through a fuel cell stack $1a$ is provided for supplying a reactant gas through the manifold $2a$. The reactant gas is supplied to each of power generation cells through gas channels $4a$ in separators $3a$ connected to the manifold $2a$.

The manifold $2a$ and the gas channels $4a$ in the separators $3a$ are connected in the stacking direction through throttle mechanisms $5a$ for limiting gas flow. According to the disclosure, the amount of gas supplied to each of the power generation cells become uniform, and stability in the cell output and improvement in the output efficiency are achieved.

Further, in a flat plate type solid oxide fuel cell disclosed in Japanese Laid-Open Patent Publication No. 10-172594, unit cells (not shown) and separators $1b$ are provided alternately, and as shown in FIG. 12, gas supply holes $2b$ and gas discharge holes $3b$ extend through four corners of the separator $1b$ in the stacking direction, and a plurality of gas flow grooves $4b$ and ridges $5b$ in a plurality of rows are arranged alternately along the surface of the separator $1b$.

The gas flow grooves $4b$ are connected to the gas supply hole $2b$ and the gas discharge hole $3b$ through triangular recesses $6b$. A throttle section $7b$ and blocks $8b$ are provided in a gas inlet of the triangular recess $6b$, near the gas supply hole $2b$, as means for limiting the flow rate of the gas.

The throttle section $7b$ and the blocks $8b$ function to increase the pressure loss of the gas flowing from the gas supply hole $2b$ to the gas inlet for uniform gas distribution. Further, at opposite ends of the gas flow grooves $4b$, shallow gas flow inlets $9b$ are provided for causing a pressure loss in the gas flow.

In Japanese Laid-Open Patent Publication No. 2006-269409, the manifold $2a$ and the gas channels $4a$ in the separators $3a$ are connected through the throttle mechanisms $5a$, and variation tends to occur in the precision of machining the throttle mechanisms $5a$. Further, in the throttle mechanisms $5a$, the pressure loss changes depending on the actual machine state (operating state) or the inspecting state (interruption state). Therefore, the pressure loss inspection cannot be performed accurately.

Further, in Japanese Laid-Open Patent Publication No. 10-172594, in order to maintain the desired pressure loss in the gas flowing from the gas supply hole $2b$ to the gas flow inlet $9b$, high machining precision of the throttle section $7b$ and the blocks $8b$ needs to be maintained. Therefore, the cost of producing the separator $1b$ becomes considerably high uneconomically.

SUMMARY OF INVENTION

The present invention has been made to solve the problems of this type, and an object of the present invention is to provide a fuel cell which makes it possible to inspect the pressure loss state during operation under an inspecting environment accurately and easily, and simplify the inspecting operation itself.

The present invention relates to a fuel cell formed by stacking an electrolyte electrode assembly between separators. The electrolyte electrode assembly includes an anode, a cathode, and an electrolyte interposed between the anode and the cathode.

Each of the separators includes a sandwiching section, a bridge connected to the sandwiching section, and a fuel gas supply section connected to the bridge. The sandwiching section sandwiches the electrolyte electrode assembly. The sandwiching section has a fuel gas channel for supplying a fuel gas along an electrode surface of the anode and a fuel gas inlet for supplying the fuel gas to the fuel gas channel. A fuel gas supply channel is formed in the bridge for supplying the fuel gas to the fuel gas inlet. A fuel gas supply passage extends through the fuel gas supply section in a stacking direction for supplying the fuel gas to the fuel gas supply channel.

The cross sectional area in an opening of the fuel gas inlet, the cross sectional area in an opening of the fuel gas supply channel, and the cross sectional area in an opening of the fuel gas supply passage are determined such that the pressure loss P1 by the fuel gas supplied to the fuel gas inlet, the pressure loss P2 by the fuel gas supplied to the fuel gas supply channel, and the pressure loss P3 by the fuel gas supplied to the fuel gas supply passage have relationships of P1>P2 and P1>P3 during operation of the fuel cell.

In the present invention, the tightening load in the stacking direction is not transmitted between the reactant gas supply section and the sandwiching sections sandwiching the electrolyte electrode assembly through the bridge, and the desired load can be applied to the electrolyte electrode assembly. With simple and compact structure, a relatively large load is applied selectively to the portion requiring high sealing performance, and a relatively small load enough to allow the electrolyte electrode assembly to tightly contact the sandwiching sections is applied to the electrolyte electrode assembly. Thus, the desired sealing performance is obtained in the reactant gas supply section, damages of the electrolyte electrode assembly are prevented as much as possible, and power generation and current collection are performed efficiently.

Further, in the inspecting environment and the operating environment, the throttle position (where the pressure loss is the largest) and the fuel gas inlet can be provided at the same position. Thus, by detecting variation in the pressure loss in the fuel gas inlet, inspection of the throttle position having the function of uniformly distributing the fuel gas can be performed easily and accurately.

Further, the throttle position is positioned at the fuel gas supply inlet. In the structure, in contrast to the case where the throttle position is provided in the fuel gas supply channel or the fuel gas supply passage, it is sufficient to carry out only inspection of the pore diameter in the inspection process.

DESCRIPTION OF EMBODIMENTS

Figure 1:
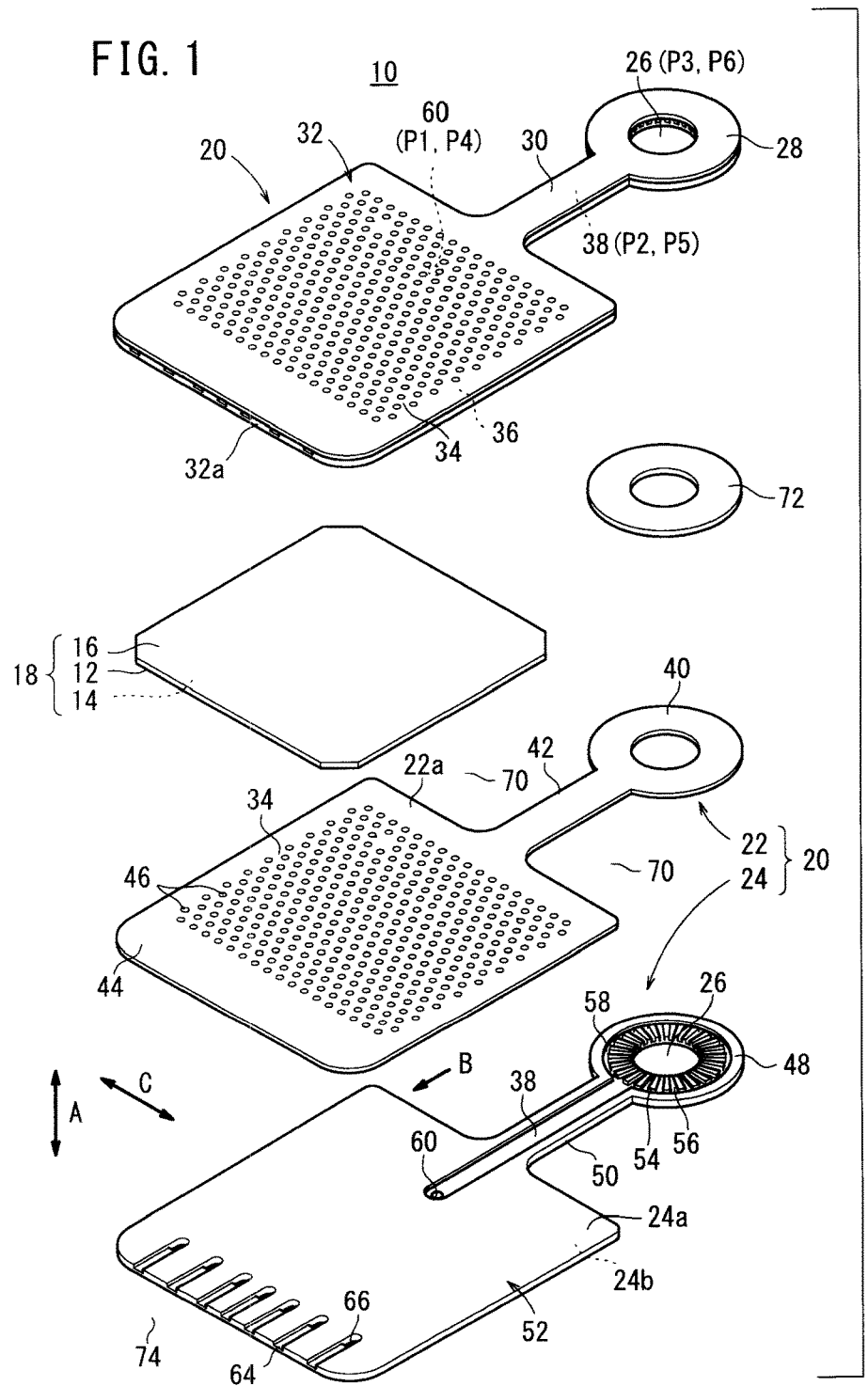
FIG. 1 is an exploded perspective view schematically showing a fuel cell according to a first embodiment of the present invention.
Figure 2:
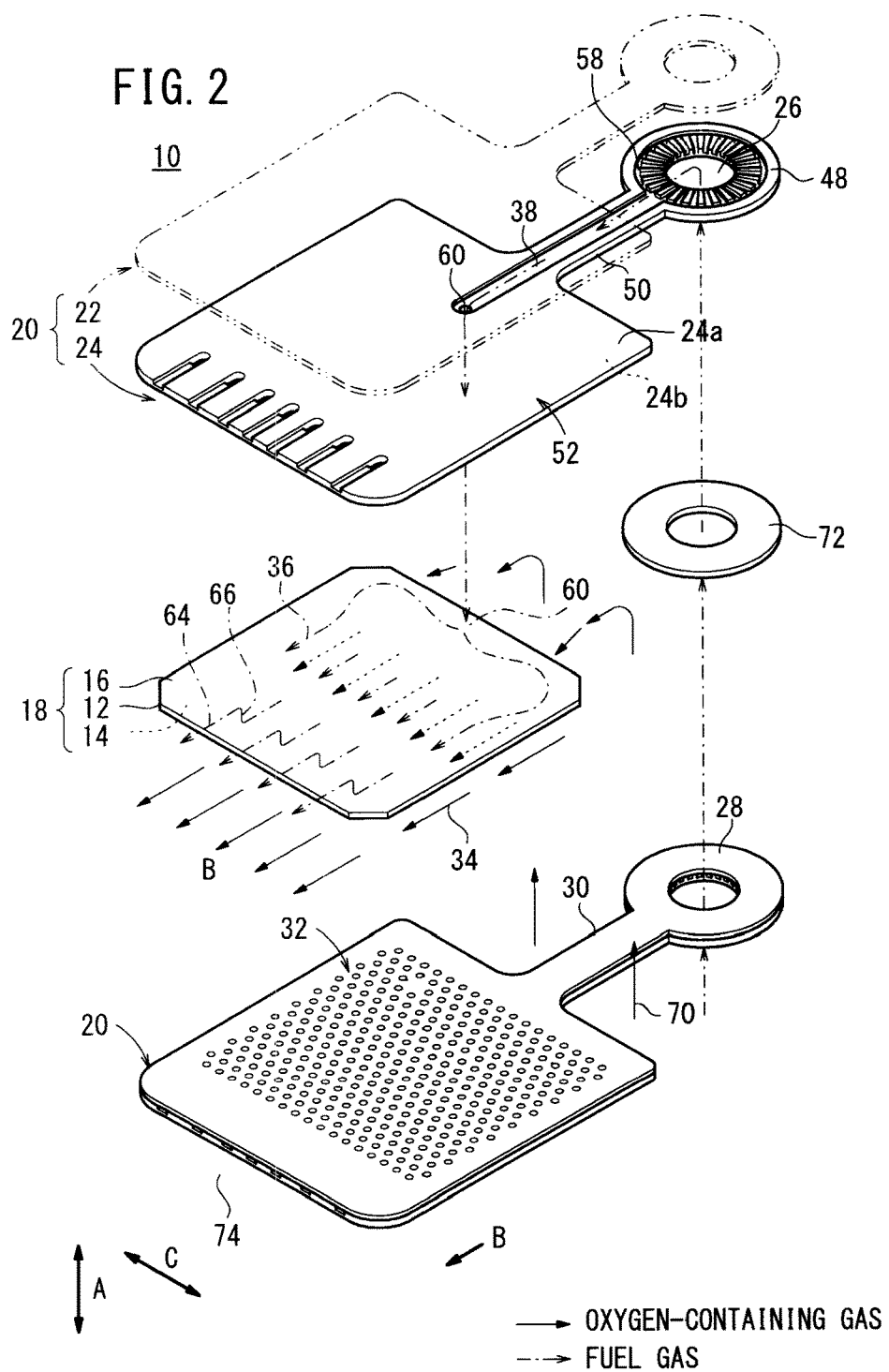
FIG. 2 is a partial exploded perspective view showing gas flows in the fuel cell.

As shown in FIGS. 1 and 2, a fuel cell 10 according to a first embodiment of the preset invention is a solid oxide fuel cell. The fuel cell 10 includes an electrolyte electrode assembly 18, for example, a membrane electrode assembly (MEA). The electrolyte electrode assembly 18 includes a cathode 14, an anode 16, and an electrolyte (electrolyte plate) 12 interposed between the cathode 14 and the anode 16. For example, the electrolyte 12 is made of ion-conductive solid oxide such as stabilized zirconia.

The electrolyte electrode assembly 18 has a rectangular shape. A barrier layer (not shown) is provided at least at the outer edge of the electrolyte electrode assembly 18 for preventing the entry or discharge of the oxygen-containing gas and the fuel gas. The electrolyte electrode assembly 18 may have a square shape. Alternatively, the electrolyte electrode assembly 18 may have a rectangular shape where the length of the outer edge in parallel with an extension line extending straight from a bridge as described later is larger than the length of the outer edge perpendicular to the extension line extending straight from the bridge.

The fuel cell 10 is formed by sandwiching a single electrolyte electrode assembly 18 between a pair of separators 20. Each of the separators 20 includes a first plate 22 and a second plate 24. Each of the first plate 22 and the second plate 24 is a metal plate of, e.g., stainless alloy. The first plate 22 and the second plate 24 are joined to each other, e.g., by brazing, diffusion bonding, or laser welding.

The separator 20 includes a fuel gas supply section 28, and a fuel gas supply passage 26 extends through the center of the fuel gas supply section 28. A rectangular sandwiching section 32 is formed integrally with a bridge 30 extending outwardly from the fuel gas supply section 28. The sandwiching section 32 and the electrolyte electrode assembly 18 have substantially the same size.

The sandwiching section 32 has an oxygen-containing gas channel 34 on its surface which contacts the cathode 14, for supplying the oxygen-containing gas along the electrode surface of the cathode 14. Further, the sandwiching section 32 has a fuel gas channel 36, on its surface which contacts the anode 16, for supplying a fuel gas along an electrode surface of the anode 16 (see FIG. 3). A fuel gas supply channel 38 is formed in the bridge 30 for supplying the fuel gas from the fuel gas supply passage 26 to the fuel gas channel 36.

As shown in FIG. 1, the first plate 22 includes a first circular disk section 40, a first elongated plate section 42 formed integrally with the first circular disk section 40, and a first rectangular section 44 formed integrally with the first elongated plate section 42. The fuel gas supply passage 26 extends through the center of the first circular disk section 40. In the first rectangular section 44, a plurality of projections 46 are formed on a surface 22a of the first plate 22 facing the cathode 14 to form the oxygen-containing gas channel 34.

The second plate 24 has a second circular disk section 48, a second elongated plate section 50 formed integrally with the second circular disk section 48, and a second rectangular section 52 formed integrally with the second elongated plate section 50. The fuel gas supply passage 26 extends through the center of the second circular disk section 48. On a surface 24a of the second plate 24 joined to the first plate 22, a plurality of ridges 54 are arranged to form an annular shape in the second circular disk section 48, and slits 56 are formed between the ridges 54. The slits 56 are connected to one end of the fuel gas supply channel 38 through an annular groove 58. The fuel gas supply channel 38 extends from the second elongated plate section 50, and the other end of the fuel gas supply channel 38 is positioned in the middle of the second rectangular section 52.

A fuel gas inlet 60 is formed in the second rectangular section 52 adjacent to the position where the fuel gas supply channel 38 is terminated. The fuel gas inlet 60 is provided on the upstream side of the flow direction of the oxygen-containing gas indicated by the arrow B as described later, i.e., adjacent to the second elongated plate section 50.

Figure 3:
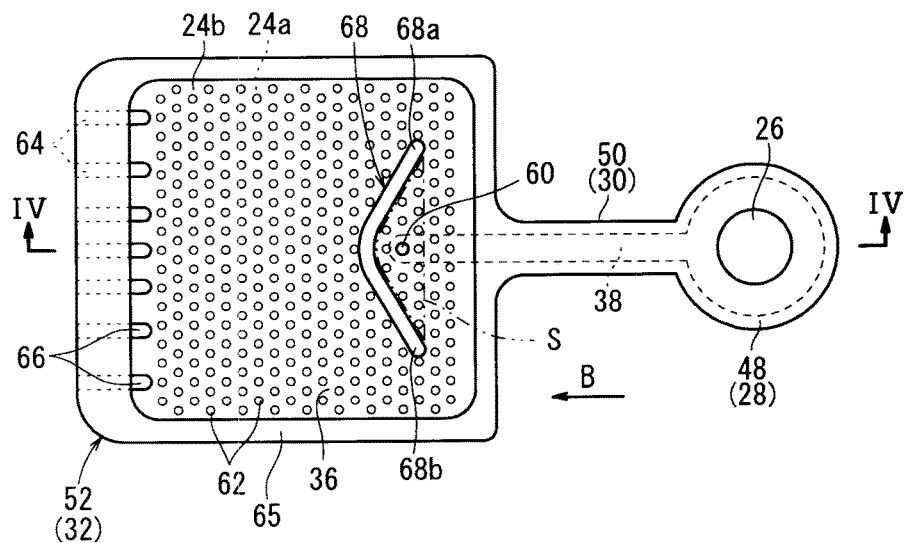
FIG. 3 is a view showing a second plate of the fuel cell.
Figure 4:
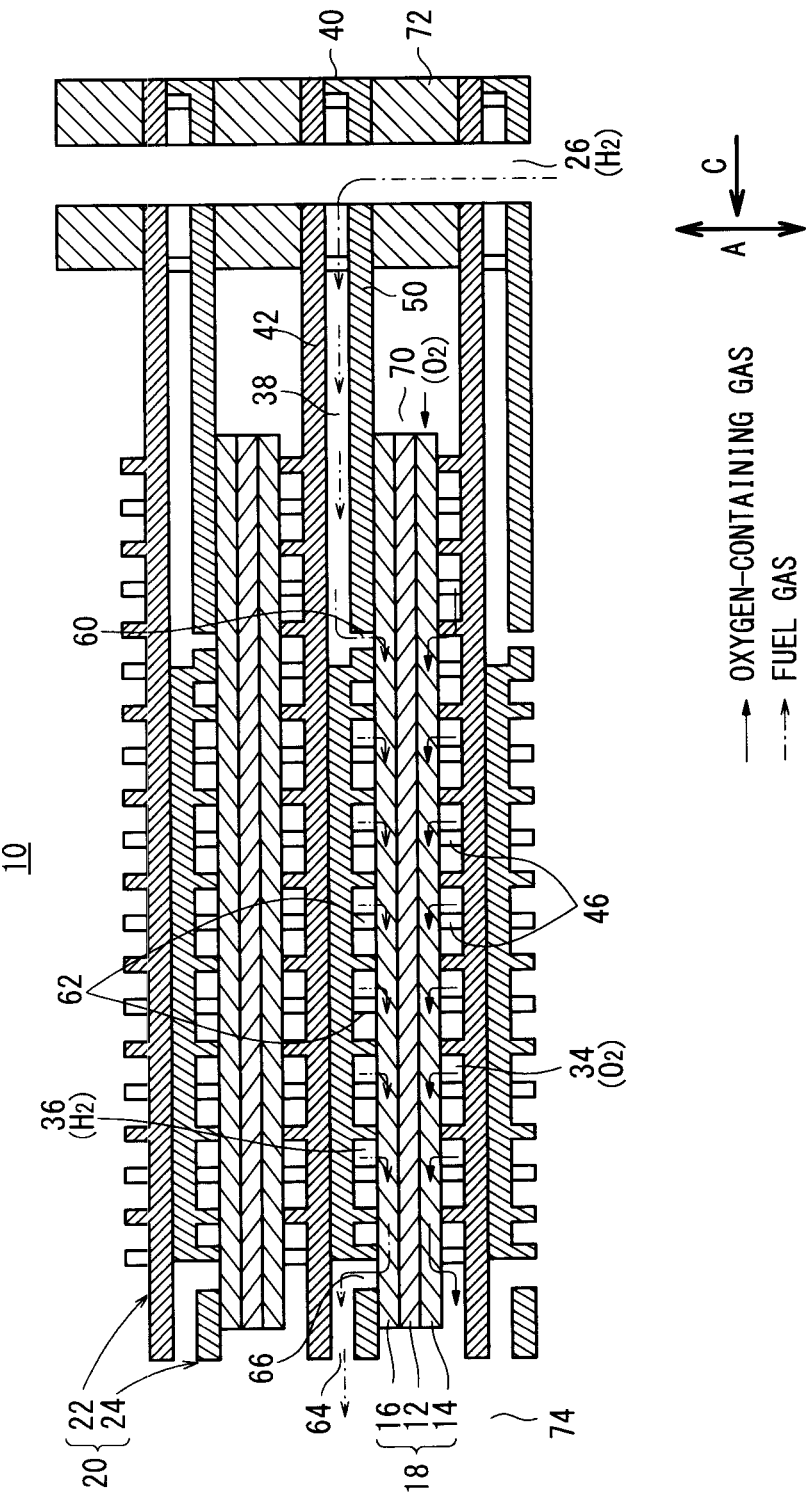
FIG. 4 is a cross sectional view showing the fuel cell, taken along a line IV-IV in FIG. 3.

As shown in FIG. 3, a plurality of projections 62 are formed on a surface 24b of the second plate 24 which contacts the anode 16. The projections 62 form a fuel gas channel 36. An outer ridge 65 is formed on the surface 24b of the second plate 24, around the fuel gas channel 36. The outer ridge 65 contacts the outer end of the anode 16.

Through holes 66 are formed on the surface 24b. The through holes 66 are connected to fuel gas outlets 64 for discharging the fuel gas after partially consumed through the fuel gas channel 36. The through holes 66 are arranged in the direction intersecting with the extension line extending straight from the second elongated plate section 50 (bridge 30). The fuel gas outlets 64 connected to the through holes 66 are arranged in a direction indicated by the arrow C, perpendicular to the extension line extending straight from the bridge 30, on one side 32a of the sandwiching section 32 (see FIG. 1).

As shown in FIG. 3, a detour path forming wall 68 which contacts the anode 16, is formed on the surface 24b of the second plate 24, between the fuel gas inlet 60 and the through holes 66 (fuel gas outlets 64). The detour path forming wall 68 is bent in a V-shape toward the fuel gas inlet 60, and prevents the fuel gas from flowing straight from the fuel gas inlet 60 to the through holes 66. The fuel gas inlet 60 is provided in an inner area S of the V-shaped detour path forming wall 68. The detour path forming wall 68 is configured such that extension lines extending straight from both ends 68a, 68b are oriented toward both corners of the sandwiching section 32.

As shown in FIGS. 1 and 2, oxygen-containing gas supply passages 70 are formed on both sides of the bridge 30, for allowing the oxygen-containing gas to flow in the direction indicated by the arrow A. The oxygen-containing gas supply passages 70 allow the oxygen-containing gas to flow in the vertical direction. The oxygen-containing gas is supplied in the direction indicated by the arrow B along the oxygen-containing gas channel 34 of each fuel cell 10.

In the pair of separators 20 sandwiching the electrolyte electrode assembly 18, an insulating seal 72 for sealing the fuel gas supply passage 26 is provided between the adjacent fuel gas supply sections 28. For example, mica material, ceramic material or the like, i.e., crustal component material, glass material, or composite material of clay and plastic may be used for the insulating seal 72.

An exhaust gas discharge passage 74 is formed in the fuel cell 10 outside the sandwiching section 32 in the direction indicated by the arrow B. The fuel gas and oxygen-containing gas after partially consumed in the reaction in the electrolyte electrode assembly 18 are discharged as an exhaust gas through the exhaust gas discharge passage 74 in a stacking direction.

In the fuel cell 10, in the first embodiment, the cross sectional area in an opening of the fuel gas inlet 60, the cross sectional area in an opening of the fuel gas supply channel 38, and the cross sectional area in an opening of the fuel gas supply passage 26 are determined such that the following relationships are satisfied during operation of the fuel cell 10.

The pressure loss P1 by the fuel gas supplied to the fuel gas inlet 60 is larger than the pressure loss P2 by the fuel gas supplied to the fuel gas supply channel 38 (P1>P2), and the pressure loss P1 by the fuel gas supplied to the fuel gas inlet 60 is larger than the pressure loss P3 by the fuel gas supplied to the fuel gas supply passage 26 (P1>P3).

Further, the volume of the fuel gas inlet 60, the volume of the fuel gas supply channel 38, and the volume of the fuel gas supply passage 26 are determined to satisfy the above relationships between the pressure losses (P1>P2 and P1>P3).

During operation of the fuel cell 10 herein means during rated operation of the fuel cell 10. Specifically, the fuel cell 10 is operated in a rated operation temperature range of 600° C. to 800° C. In this rated operation temperature range, the relationships of P1>P2 and P1>P3 are satisfied.

Further, the cross sectional area in the opening of the fuel gas inlet 60, the cross sectional area in the opening of the fuel gas supply channel 38, and the cross sectional area in the opening of the fuel gas supply passage 26 are determined such that the following relationships are satisfied during interruption of operation of the fuel cell 10.

The ratio of the pressure loss P4 by the oxygen-containing gas (pressure loss inspection gas) supplied to the fuel gas inlet 60 to the pressure loss P5 by the oxygen-containing gas supplied to the fuel gas supply channel 38 is larger than 10 (P4/P5>10), and the ratio of the pressure loss P4 by the oxygen-containing gas (pressure loss inspection gas) supplied to the fuel gas inlet 60 to the pressure loss P6 by the oxygen-containing gas supplied to the fuel gas supply passage 26 is larger than 10 (P4/P6>10).

Further, the volume of the fuel gas inlet 60, the volume of the fuel gas supply channel 38, and the volume of the fuel gas supply passage 26 are determined to satisfy the above relationships between the pressure losses (P4/P5>10 and P4/P6>10).

Further, in a normal temperature range during interruption of operation of the fuel cell 10, specifically, in a range of 0° C. to 20° C., the relationships between the pressure losses, P4/P5>10 and P4/P6>10 are satisfied.

The pressure losses P1, P2, P3, and the pressure losses P4, P5, P6 are the pressure loss in the entire fuel gas inlet 60, the pressure loss in the entire fuel gas supply channel 38, and the pressure loss in the entire fuel gas supply passage 26.

In the first embodiment, the single fuel gas inlet 60, the single fuel gas supply channel 38, and the single fuel gas supply passage 26 are provided. Therefore, the pressure losses P1, P2, P3, and the pressure losses P4, P5, P6 are equal to the pressure losses ΔP1, ΔP2, ΔP3, and the pressure losses ΔP4, ΔP5, ΔP6 represented by the following expressions.

Pressure loss inspection of the fuel cell 10 is performed in the normal temperature range. The air (oxygen-containing gas) is supplied as the pressure loss inspection gas, and the total pressure loss (P4+P5+P6) is measured. Then, the pressure losses P4, P5, and P6 are calculated, and ratios of these pressure losses P4, P5, and P6 are computed. Further, based on the pressure losses P4, P5, and P6, the pressure losses P1, P2, and P3 during operation are computed.

The pressure loss P1 (P4) in the fuel gas inlet 60 is calculated by the following expression.

$$\Delta P1(\Delta P4) = \left(\lambda \frac{l}{d} + \zeta_1 + \zeta_2\right)\frac{\rho V^2}{2} \quad (1)$$

$$= (\zeta_1 + \zeta_2)\frac{\rho V^2}{2} + \mu \frac{32\, lV}{d^2}$$

Further, the pressure loss P2 (P5) in the fuel gas supply channel 38 and the pressure loss P3 (P6) in the fuel gas supply passage 26 are calculated by the following expression.

$$\Delta P2(\Delta P5), \quad (2)$$

$$\Delta P3(\Delta P6) = \lambda \frac{l}{d} \frac{\rho V^2}{2} = \frac{64}{Re}\frac{l}{d}\frac{\rho V^2}{2} = 64\frac{\mu}{\rho dV}\frac{l}{d}\frac{\rho V^2}{2} = \mu \frac{32\, lV}{d^2}$$

In the expressions, λ denotes the pipe friction factor, l denotes the length of the fluid channel, d denotes the diameter (or equivalent hydraulic diameter) of the fluid channel, V denotes the velocity, Re denotes the Reynolds number, μ denotes the viscosity, $\zeta_1$ denotes the sudden contraction loss factor, $\zeta_2$ denotes the sudden expansion loss factor, and ρ denotes the fluid density.

As described above, in particular, the pressure loss P1 (P4) in the fuel gas inlet 60 changes depending on physical properties of the fluid that flows into the fuel gas inlet 60 (fluid density).

During operation of the fuel cell 10, the fluid that flows into the fuel gas route is a fuel gas (mixed gas of $CH_4$, CO, H$_2$, H$_2$O) (density $\rho$=0.212), and the operating temperature of the fuel gas is, e.g., 700° C. During inspection of the pressure loss in the fuel cell 10, the fluid that flows in the fuel gas system is the air (density $\rho$=1.20), and the ambient temperature is, e.g., 20° C. Therefore, the pressure loss $\Delta$P1 (fuel gas at operating temperature)/the pressure loss $\Delta$P4 (air at the room temperature) is nearly equal to 0.13 ($\Delta$P1/$\Delta$P4≈0.13).

Further, in the fuel gas supply channel 38, the pressure loss $\Delta$P2 (fuel gas at the operating temperature)/the pressure loss $\Delta$P5 (air at the room temperature) is equal to $\mu$ (fuel gas at the operating temperature)×V (fuel gas at the operating temperature)/$\mu$ (air at the room temperature)×V (air at the room temperature), which is nearly equal to 1.2 ($\Delta$P2/$\Delta$P5≈1.2). Likewise, in the fuel gas supply passage 26, the pressure loss $\Delta$P3 (fuel gas at the operating temperature)/the pressure loss $\Delta$P6 (air at the room temperature) is nearly equal to 1.2 ($\Delta$P3/$\Delta$P6≈1.2).

In the first embodiment, the pressure loss $\Delta$P1 (fuel gas at the operating temperature) is larger than the pressure loss $\Delta$P2 (fuel gas at the operating temperature) ($\Delta$P1>$\Delta$P2). Further, the pressure loss $\Delta$P1 (fuel gas at the operating temperature) is larger than the pressure loss $\Delta$P3 (fuel gas at the operating temperature) ($\Delta$P1>$\Delta$P3).

Therefore, the value obtained by multiplying the pressure loss $\Delta$P4 (air at the room temperature) by 0.13 is larger than the value obtained by multiplying the pressure loss $\Delta$P5 (air at the room temperature) by 1.2 (0.13×$\Delta$P4>1.2×$\Delta$P5), and the value obtained by multiplying the pressure loss $\Delta$P4 (air at the room temperature) by 0.13 is larger than the value obtained by multiplying the pressure loss $\Delta$P6 (air at the room temperature) by 1.2 (0.13×$\Delta$P4>1.2×$\Delta$P6). Further, the pressure loss $\Delta$P4 (air at the room temperature) is larger than the value obtained by multiplying the pressure loss $\Delta$P5 (air at the room temperature) by 10 ($\Delta$P4>10×$\Delta$P5), and the pressure loss $\Delta$P4 (air at the room temperature) is larger than the value obtained by multiplying the pressure loss $\Delta$P6 (air at the room temperature) by 10 ($\Delta$P4>10×$\Delta$P6).

Operation of the fuel cell 10 will be described below.

As shown in FIG. 1, for example, a reformed gas produced by steam reforming of a raw fuel such as the city gas (including CH$_4$, C$_2$H$_6$, C$_3$H$_8$, C$_4$H$_{10}$) is supplied as the fuel gas to the fuel gas supply passage 26 of the fuel cell 10. Further, the air is supplied as the oxygen-containing gas to the oxygen-containing gas supply passage 70 of the fuel cell 10.

As shown in FIGS. 1 and 2, the fuel gas supplied to the fuel gas supply passage 26 flows from the slits 56 into the annular groove 58 in the separator 20 of each fuel cell 10, and the fuel gas flows into the fuel gas supply channel 38 formed in the bridge 30. The fuel gas flows from the fuel gas supply channel 38 to the fuel gas channel 36 through the fuel gas inlet 60.

As shown in FIG. 3, the fuel gas inlet 60 is provided adjacent to the bridge 30, in the inner area S of the detour path forming wall 68. In the structure, after the fuel gas flows from the fuel gas inlet 60 into the fuel gas channel 36, by the guidance of the detour path forming wall 68, the fuel gas flowing through the fuel gas channel 36 is supplied to the anode 16 of the electrolyte electrode assembly 18, and then, the fuel gas after partially consumed is discharged through the through holes 66 and the fuel gas outlets 64 to the exhaust gas discharge passage 74.

As shown in FIG. 2, the air supplied to the oxygen-containing gas supply passage 70 flows into the oxygen-containing gas channel 34 formed between the cathode 14 of each electrolyte electrode assembly 18 and the surface 22a of the separator 20. The oxygen-containing gas moves through the oxygen-containing gas channel 34 in the direction indicated by the arrow B. Then, the oxygen-containing gas is supplied to the cathode 14 of the electrolyte electrode assembly 18, and discharged into the exhaust gas discharge passage 74.

Thus, in the electrolyte electrode assembly 18, the fuel gas is supplied to the anode 16, and the air is supplied to the cathode 14. At this time, oxide ions flow through the electrolyte 12 toward the anode 16 for generating electricity by the electrochemical reactions.

In the first embodiment, the tightening load in the stacking direction is not transmitted between the fuel gas supply section 28 and the sandwiching sections 32 sandwiching the electrolyte electrode assembly 18 through the elongated bridge 30. In the structure, the desired tightening load is applied to the electrolyte electrode assembly 18.

Thus, with simple and compact structure, a relatively large load is applied to the fuel gas supply section 28 requiring high sealing performance, and a relatively small load enough to allow the electrolyte electrode assembly 18 to tightly contact the sandwiching sections 32 is applied to the electrolyte electrode assembly 18. In the structure, the desired sealing performance is obtained in the fuel gas supply section 28, and damages of the electrolyte electrode assembly 18 are prevented as much as possible. Moreover, power generation and current collection are performed efficiently.

Further, in the inspecting environment and the operating environment, the fuel gas inlet 60 and the throttle position where the pressure loss is the largest can be provided at the same position. Specifically, if the pressure loss $\Delta$P1 (fuel gas at the operating temperature) is larger than the pressure loss $\Delta$P2 (fuel gas at the operating temperature), and the pressure loss $\Delta$P1 (fuel gas at the operating temperature) is larger than the pressure loss $\Delta$P3 (fuel gas at the operating temperature), the pressure loss $\Delta$P4 (air at the room temperature) is larger than the value obtained by multiplying the pressure loss $\Delta$P5 (air at the room temperature) by 10 ($\Delta$P4>10×$\Delta$P5), and the pressure loss $\Delta$P4 (air at the room temperature) is larger than the value obtained by multiplying the pressure loss $\Delta$P6 (air at the room temperature) by 10 ($\Delta$P4>10×$\Delta$P6).

For example, if the fuel gas supply channel 38 is provided at the throttle position, even in the case where the pressure loss $\Delta$P2 (fuel gas at the operating temperature) is larger than the pressure loss $\Delta$P1 (fuel gas at the operating temperature), the pressure loss $\Delta$P4 (air at the room temperature) tends to be equal to or larger than the pressure loss $\Delta$P5 (air at the room temperature). Therefore, when the pressure loss inspection of the fuel cell 10 is performed, the pressure loss in the fuel gas inlet 60 may be balanced with the pressure loss in the fuel gas supply channel 38. Thus, it may not be possible to determine whether or not variation in the detected total pressure loss depends on the machining precision in the fuel gas supply channel 38.

In view of the above, the fuel gas inlet 60 is provided at the throttle position. Thus, simply by detecting variation in the pressure loss in the fuel gas inlet 60, inspection at the throttle position having the function of uniformly distributing the fuel gas is performed easily and accurately.

Further, since the throttle position is provided at the fuel gas inlet 60, in contrast to the case where the throttle position is provided at the fuel gas supply channel 38 or the fuel gas supply passage 26, it is sufficient to carry out only inspection of the pore diameter in the inspection process.

Further, the cross sectional area in the opening (volume) of the fuel gas inlet 60, the cross sectional area in the opening (volume) of the fuel gas supply channel 38, and the cross sectional area in the opening (volume) of the fuel gas supply passage 26 are determined to satisfy the relationships of P1>P2 and P1>P3. Therefore, in the inspecting environment and the operating environment, the throttle position and the fuel gas inlet 60 can be provided at the same position. Thus, by detecting variation in the pressure loss in the fuel gas inlet 60, inspection of the throttle position having the function of uniformly distributing the fuel gas can be performed easily and accurately.

Further, in the fuel cell 10, in the rated operating temperature range during rated operation of the fuel cell 10, specifically, in the rated operating temperature range of 600° C. to 800° C., the relationships of P1>P2 and P1>P3 are satisfied. Therefore, in the inspecting environment and the operating environment, the throttle position and the fuel gas inlet 60 can be provided at the same position. Thus, by detecting variation in the pressure loss in the fuel gas inlet 60, inspection of the throttle position having the function of uniformly distributing the fuel gas can be performed easily and accurately.

Further, in the fuel cell 10, the cross sectional area in the opening (volume) of the fuel gas inlet 60, the cross sectional area in the opening (volume) of the fuel gas supply channel 38, and the cross sectional area in the opening (volume) of the fuel gas supply passage 26 are determined to satisfy the relationships where the ratio of the pressure loss P4 by the oxygen-containing gas supplied to the fuel gas inlet 60 to the pressure loss P5 by the oxygen-containing gas supplied to the fuel gas supply channel 38 is larger than 10 (P4/P5>10), and the ratio of the pressure loss P4 by the oxygen-containing gas supplied to the fuel gas inlet 60 to the pressure loss P6 by the oxygen-containing gas supplied to the fuel gas supply passage 26 is larger than 10 (P4/P6>10) during interruption of operation of the fuel cell 10.

Therefore, in the inspecting environment during interruption of operation of the fuel cell 10 and the rated operating environment, the throttle position and the fuel gas inlet 60 can be provided at the same position. Thus, by detecting variation in the pressure loss in the fuel gas inlet 60, inspection of the throttle position having the function of uniformly distributing the fuel gas can be performed easily and accurately.

Further, in the fuel cell 10, in the normal temperature range during interruption of operation of the fuel cell 10, specifically, in the range of 10° C. to 30° C., the relationships of P4/P5>10 and P4/P6>10 are satisfied. Therefore, in the inspecting environment in the normal temperature range and the rated operating environment, the throttle position and the fuel gas inlet 60 can be provided at the same position. Thus, by detecting variation in the pressure loss in the fuel gas inlet 60, inspection of the throttle position having the function of uniformly distributing the fuel gas can be performed easily and accurately.

Further, the fuel cell 10 is a solid oxide fuel cell. Thus, the present invention is optimally applicable to a high temperature fuel cell such as the solid oxide fuel cell. In particular, in the case where the present invention is applied to the fuel cell 10 having a large difference between the temperature range during interruption of operation and the temperature range during rated operation, the machining precision can be inspected easily, and the fuel gas can be distributed uniformly by maintaining the optimum pressure loss in consideration of the operating temperature and the supplied fluid.

Figure 5:
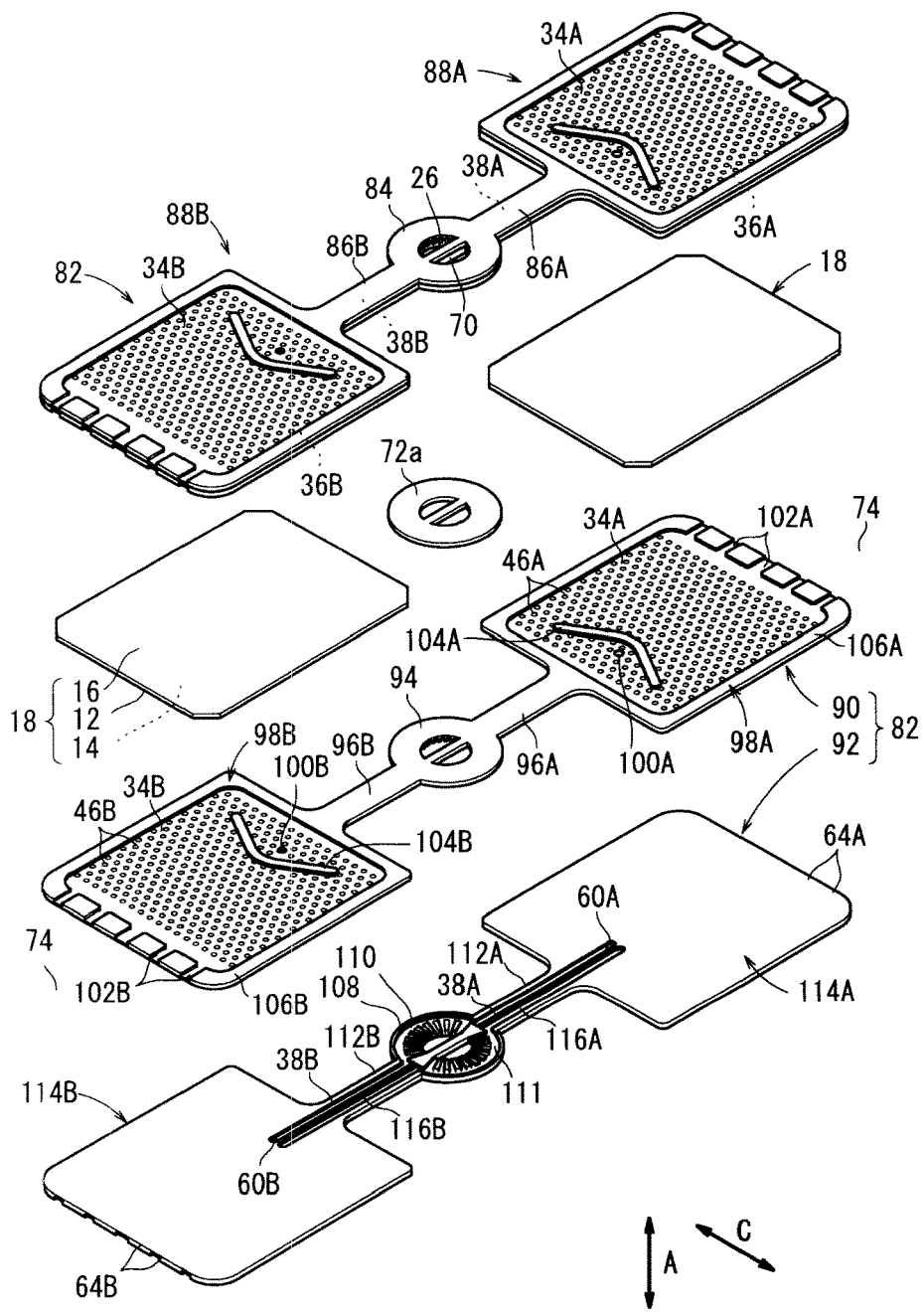
FIG. 5 is an exploded perspective view schematically showing a fuel cell according to a second embodiment of the present invention.

FIG. 5 is an exploded perspective view schematically showing a fuel cell 80 according to a second embodiment of the present invention.

The constituent elements that are identical to those of the fuel cell 10 according to the first embodiment are labeled with the same reference numerals, and description thereof will be omitted. Also in third and other embodiments as described later, the constituent elements that are identical to those of the fuel cell 10 according to the first embodiment are labeled with the same reference numerals, and description thereof will be omitted.

Figure 6:
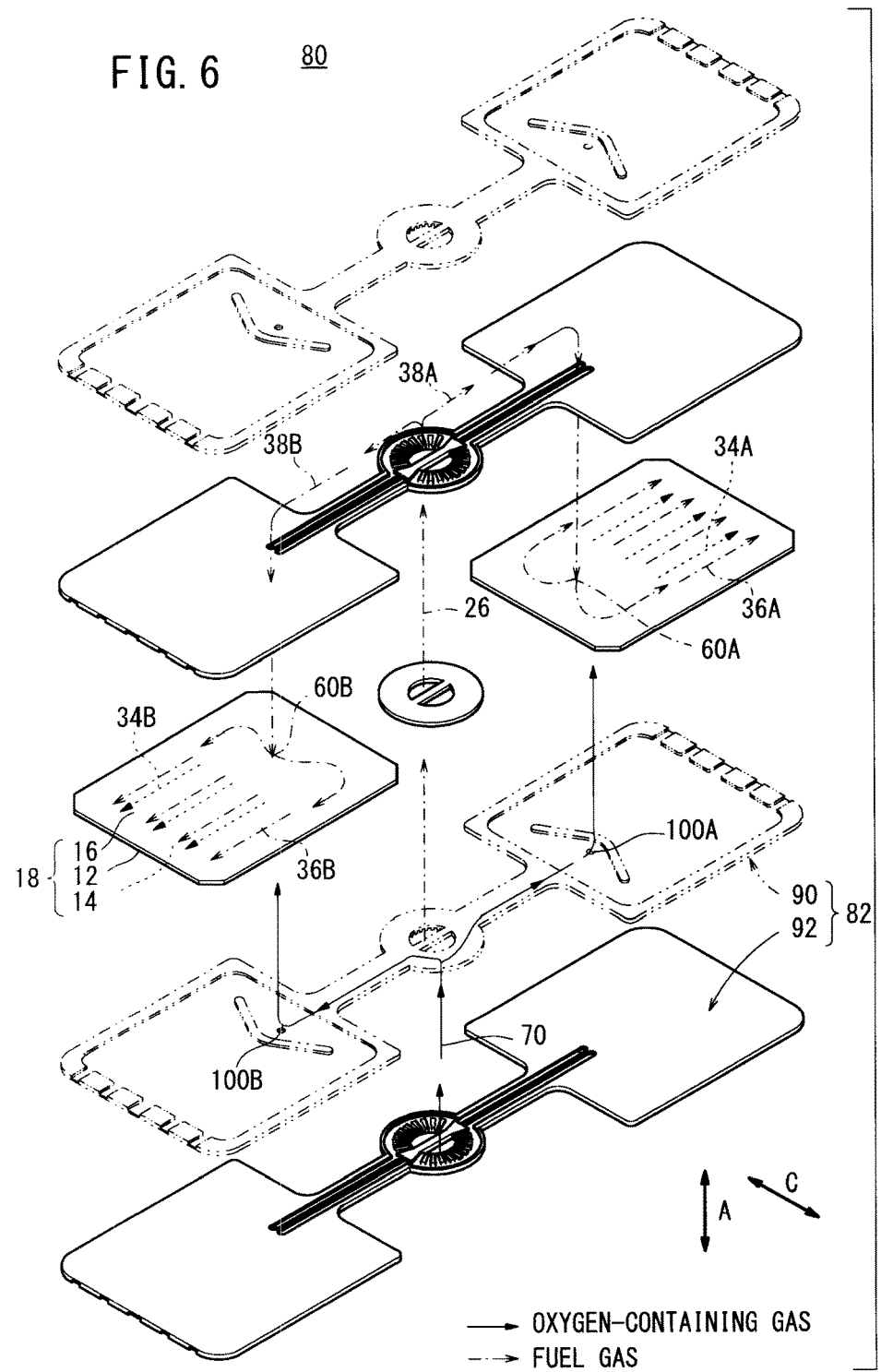
FIG. 6 is a partial exploded perspective view showing gas flows in the fuel cell.

As shown in FIGS. 5 and 6, the fuel cell 80 includes a pair of separators 82 sandwiching two electrolyte electrode assemblies 18 in the same plane. The separator 82 includes a reactant gas supply section 84, and a fuel gas supply passage 26 and an oxygen-containing gas supply passage 70 extend through the reactant gas supply section 84. A pair of bridges 86A, 86B are connected to the reactant gas supply section 84. The bridges 86A, 86B extend from the reactant gas supply section 84 in opposite directions to each other. Rectangular sandwiching sections 88A, 88B are formed integrally with the bridges 86A, 86B.

The separator 82 includes a first plate 90 and a second plate 92. The first plate 90 includes a first circular disk section 94, and the fuel gas supply passage 26 and the oxygen-containing gas supply passage 70 each having a semicircular shape extend through the first circular disk section 94. First elongated plate sections 96A, 96B are formed integrally with the first circular disk section 94, and the first elongated plate sections 96A, 96B extend from the first circular disk section 94 in opposite directions to each other. First rectangular sections 98A, 98B are formed integrally with the first elongated plate sections 96A, 96B.

Oxygen-containing gas channels 34A, 34B are formed by a plurality of projections 46A, 46B in the surfaces of the first rectangular sections 98A, 98B. Oxygen-containing gas inlets 100A, 100B are provided adjacent to the first circular disk section 94. A plurality of oxygen-containing gas outlets 102A, 102B are formed at the respective front ends of the first rectangular sections 98A, 98B. The oxygen-containing gas outlets 102A, 102B are connected to the exhaust gas discharge passage 74.

In the first rectangular sections 98A, 98B, detour path forming walls 104A, 104B are provided adjacent to the oxygen-containing gas inlets 100A, 100B, and the detour path forming walls 104A, 104B are bent in a V-shape toward the oxygen-containing gas inlets 100A, 100B. Outer ridges 106A, 106B are formed in the first rectangular sections 98A, 98B around the oxygen-containing gas channels 34A, 34B, and contact the outer edges of the cathodes 14.

The second plate 92 includes a second circular disk section 108. The second circular disk section 108 includes an annular groove 110 connected to the fuel gas supply passage 26, and an annular groove 111 connected to the oxygen-containing gas supply passage 70. Second elongated plate sections 112A, 112B are formed integrally with the second circular disk section 108, and the second elongated plate sections 112A, 112B extend from the second circular disk section 108 in opposite directions to each other.

Second rectangular sections 114A, 114B are formed integrally with the second elongated plate sections 112A, 112B. In the second elongated plate sections 112A, 112B, fuel gas supply channels 38A, 38B and oxygen-containing gas supply channels 116A, 116B are provided in parallel with each other. Fuel gas inlets 60A, 60B are formed at front ends of the fuel gas supply channels 38A, 38B.

Figure 7:
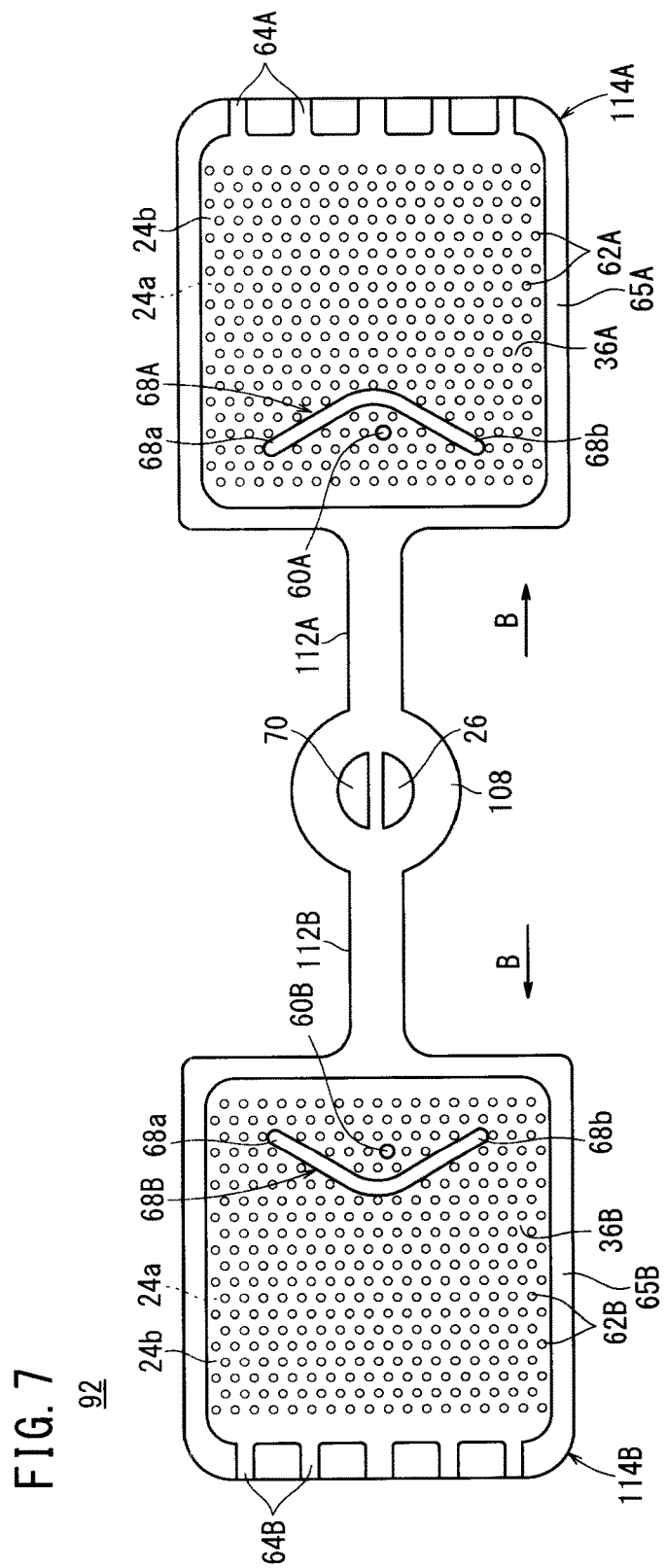
FIG. 7 is a view showing a second plate of the fuel cell.

As shown in FIG. 7, fuel gas channels 36A, 36B are formed by a plurality of projections 62A, 62B in the second rectangular sections 114A, 114B. A plurality of fuel gas outlets 64A, 64B are formed in the outer ridges 65A, 65B. Detour path forming walls 68A, 68B are formed between the fuel gas outlets 64A, 64B and the fuel gas inlets 60A, 60B.

As shown in FIG. 5, an insulating ring 72a is interposed in each space between the adjacent separators 82, and is sandwiched between the reactant gas supply sections 84. The insulating ring 72a functions as a seal for the fuel gas supply passage 26 and the oxygen-containing gas supply passage 70.

In the fuel cell 80, the pressure losses P1, P4 in the entire fuel gas inlets 60A, 60B, the pressure losses P2, P5 in the entire fuel gas supply channels 38A, 38B, and the pressure losses P3, P6 in the entire fuel gas supply passage 26 have the relationships of P1>P2 and P1>P3 in the rated operating temperature range, and the relationships of P4/P5>10 and P4/P6>10 in the normal temperature range during interruption of operation.

Therefore, in the second embodiment, the same advantages as in the case of the first embodiment are obtained. For example, in the inspecting environment and the operating environment, the throttle positions and the fuel gas inlets 60A, 60B can be provided at the same position, and inspection of the throttle position having the function of uniformly distributing the fuel gas can be performed easily and accurately.

Next, operation of the fuel cell 80 will be described below. In the reactant gas supply section 84 of each separator 82, the fuel gas and the oxygen-containing gas flow along the fuel gas supply passage 26 and the oxygen-containing gas supply passage 70 in the stacking direction.

The fuel gas flows through the fuel gas supply channels 38A, 38B formed in the bridges 86A, 86B, and flows through the fuel gas inlets 60A, 60B into the fuel gas channels 36A, 36B. As shown in FIG. 7, the fuel gas flows uniformly along the fuel gas channels 36A, 36B by the guidance of the detour path forming walls 68A, 68B, and the fuel gas is supplied to each anode 16. The fuel gas after partially consumed is discharged from the fuel gas outlets 64A, 64B to the exhaust gas discharge passage 74.

The oxygen-containing gas flows along the oxygen-containing gas supply channels 116A, 116B formed in the bridges 86A, 86B, and then, the oxygen-containing gas flows through the oxygen-containing gas inlets 100A, 100B into the oxygen-containing gas channels 34A, 34B.

As shown in FIGS. 5 and 6, the oxygen-containing gas flows uniformly along the oxygen-containing gas channels 34A, 34B by the guidance of the detour path forming walls 104A, 104B, and then, the oxygen-containing gas is supplied to each cathode 14. The oxygen-containing gas after partially consumed is discharged into the exhaust gas discharge passage 74 through the oxygen-containing gas outlets 102A, 102B.

Figure 8:
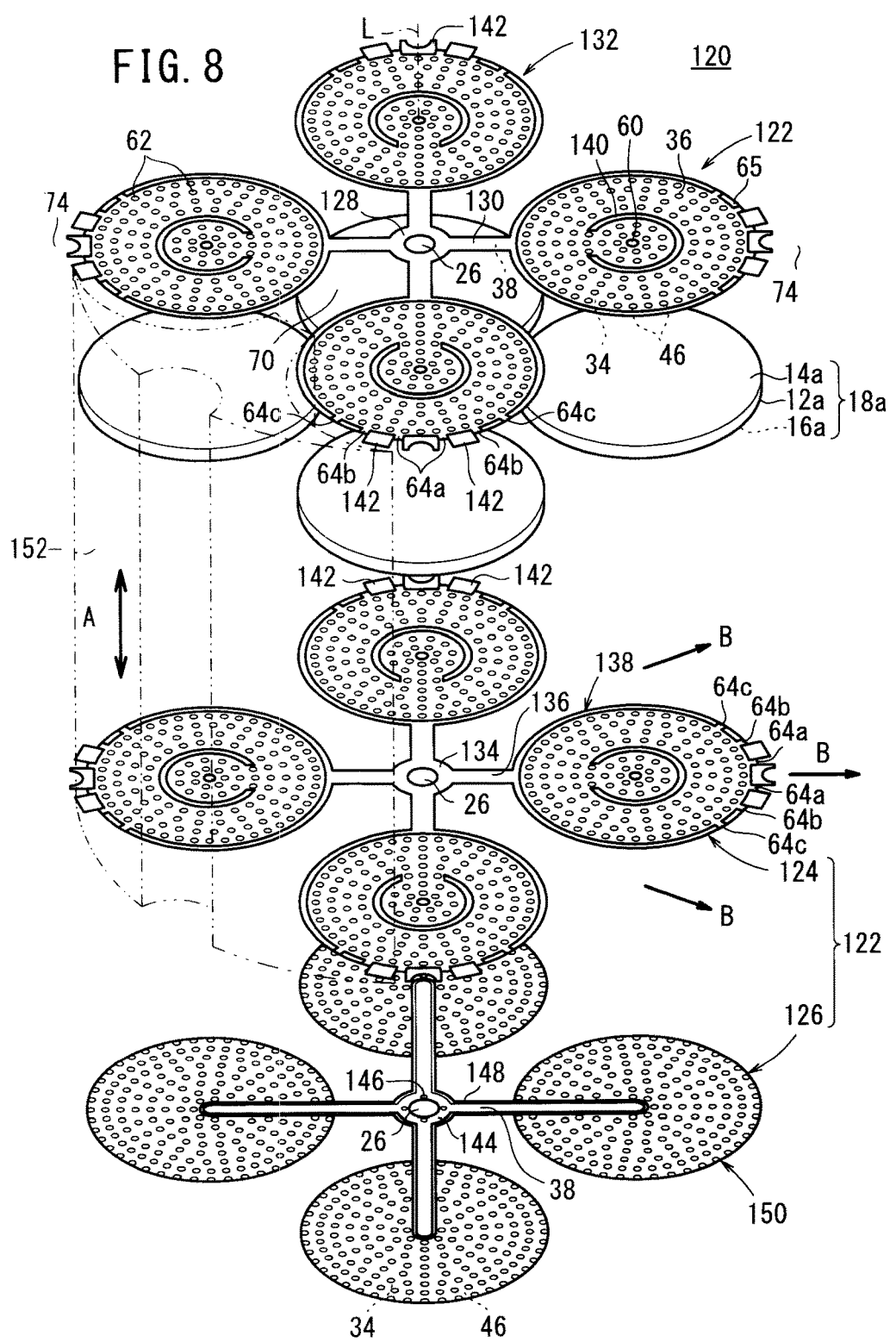
FIG. 8 is an exploded perspective view schematically showing a fuel cell according to a third embodiment of the present invention.

FIG. 8 is an exploded perspective view schematically showing a fuel cell 120 according to a third embodiment of the present invention.

Figure 9:
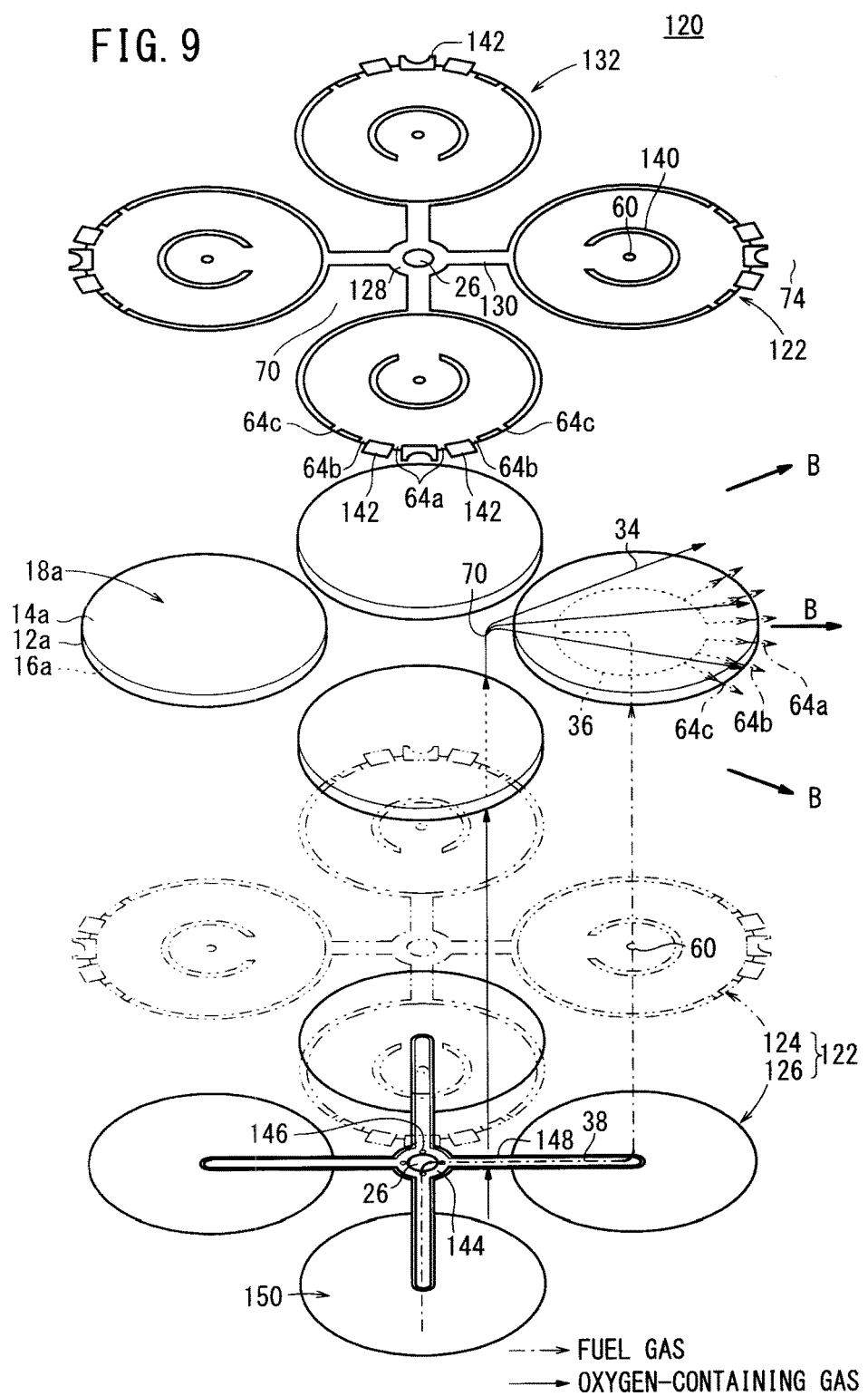
FIG. 9 is a partial exploded perspective view showing gas flows in the fuel cell.

As shown in FIGS. 8 and 9, the fuel cell 120 includes electrolyte electrode assemblies 18a, for example, membrane electrode assemblies (MEAs). Each of the electrolyte electrode assembly 18a includes a cathode 14a, an anode 16a, and an electrolyte (electrolyte plate) 12a interposed between the cathode 14a and the anode 16a. For example, the electrolyte 12a is made of ion-conductive solid oxide such as stabilized zirconia. The electrolyte electrode assembly 18a has a circular disk shape. A barrier layer (not shown) is provided at least at the outer edge of the electrolyte electrode assembly 18a for preventing the entry or discharge of the oxygen-containing gas and the fuel gas.

The fuel cell 120 is formed by stacking a plurality of, e.g., four electrolyte electrode assemblies 18a between the separators 122. The electrolyte electrode assemblies 18a are arranged concentrically around the fuel gas supply passage 26 extending through the center of the separators 122.

As shown in FIG. 8, the separator 122 is formed by joining a first plate 124 and a second plate 126 together. The separator 122 includes a fuel gas supply section 128, and the fuel gas supply passage 26 extends through the center of the fuel gas supply section 128. Four bridges 130 extend radially outwardly from the fuel gas supply section 128 at equal intervals, e.g., 90°. The fuel gas supply section 128 is integral with sandwiching sections 132 each having a relatively large diameter through the bridges 130. The distances between the center of the fuel gas supply section 128 and the centers of the sandwiching sections 132 are the same.

The sandwiching sections 132 are circular disk-shaped. The sandwiching sections 132 and the electrolyte electrode assemblies 18a have substantially the same size. The sandwiching sections 132 are separated from each other. An oxygen-containing gas channel 34 for supplying the oxygen-containing gas along the electrode surface of the cathode 14a is formed on the surface of the sandwiching section 132 which contacts the cathode 14a.

A fuel gas channel 36 for supplying the fuel gas along the electrode surface of the anode 16a is formed on the surface of the sandwiching section 132 which contacts the anode 16a. A fuel gas supply channel 38 for supplying the fuel gas from the fuel gas supply passage 26 to each fuel gas channel 36 is formed in each of the bridges 130.

The first plate 124 includes a first circular disk section 134, four first elongated plate sections 136, and first circular disk sections 138. The fuel gas supply passage 26 extends through the center of the first circular disk section 134. The four first elongated plate sections 136 are formed integrally with the first circular disk section 134, and extend radially outwardly. The first circular disk sections 138 are formed integrally with the first elongated plate sections 136.

A fuel gas inlet 60 for supplying the fuel gas is formed, e.g., at the center of the first circular disk section 138, or at a position deviated from, and upstream of the center of the first circular disk section 138 in the flow direction of the oxygen-containing gas.

A plurality of projections 62 and an outer ridge 65 protruding toward the fuel gas channel 36 to contact the outer end of the anode 16a are formed in the surface of the first circular disk section 138 which contacts the anode 16a. The projections 62 form a fuel gas channel 36. A pair of fuel gas outlets 64a, a pair of fuel gas outlets 64b, and a pair of fuel gas outlets 64c for discharging the fuel gas after partially consumed in the fuel gas channel 36 are formed in the first circular disk section 138. Further, a detour path forming wall 140 having a circular arc shape which contacts the anode 16a for preventing the fuel gas from flowing straight from the fuel gas inlet 60 to the fuel gas outlets 64a, 64b, 64c is formed in the first circular disk section 138.

The cross sectional areas in the openings of the fuel gas outlets 64a, 64b, 64c are the same, and the fuel gas outlets 64a, 64b, 64c are provided at equal intervals, on the side opposite to the portion connecting the sandwiching section 132 and the bridge 130, and on both sides of the extension line extending straight from the bridge 130. The detour path forming wall 140 has a horseshoe shape (circular shape with partial cutout), and the fuel gas inlet 60 is formed inside the detour path forming wall 140.

The first circular disk section 138 has a pair of extensions 142 for collecting electrical energy generated in power generation of the electrolyte electrode assembly 18*a* or measuring the state of the electrolyte electrode assembly 18*a*. The extensions 142 are provided at the outer end of the first circular disk section 138, between the fuel gas outlets 64*a*, 64*b*.

As shown in FIG. 8, the second plate 126 includes a second circular disk section 144, and the fuel gas supply passage 26 extends through the center of the second circular disk section 144. A predetermined number of reinforcement bosses 146 are provided in the second circular disk section 144. Four second elongated plate sections 148 extend radially from second circular disk section 144, and a fuel gas supply channel 38 connecting the fuel gas supply passage 26 to the fuel gas inlet 60 is formed in the second elongated plate section 148.

A second circular disk section 150 having a relatively large diameter is formed integrally with each of the second elongated plate sections 148. A plurality of projections 46 are provided in the second circular disk sections 150, e.g., by press forming, and the oxygen-containing gas channel 34 for supplying the oxygen-containing gas along the electrode surface of the cathode 14*a* is formed by the projections 46.

Figure 10:
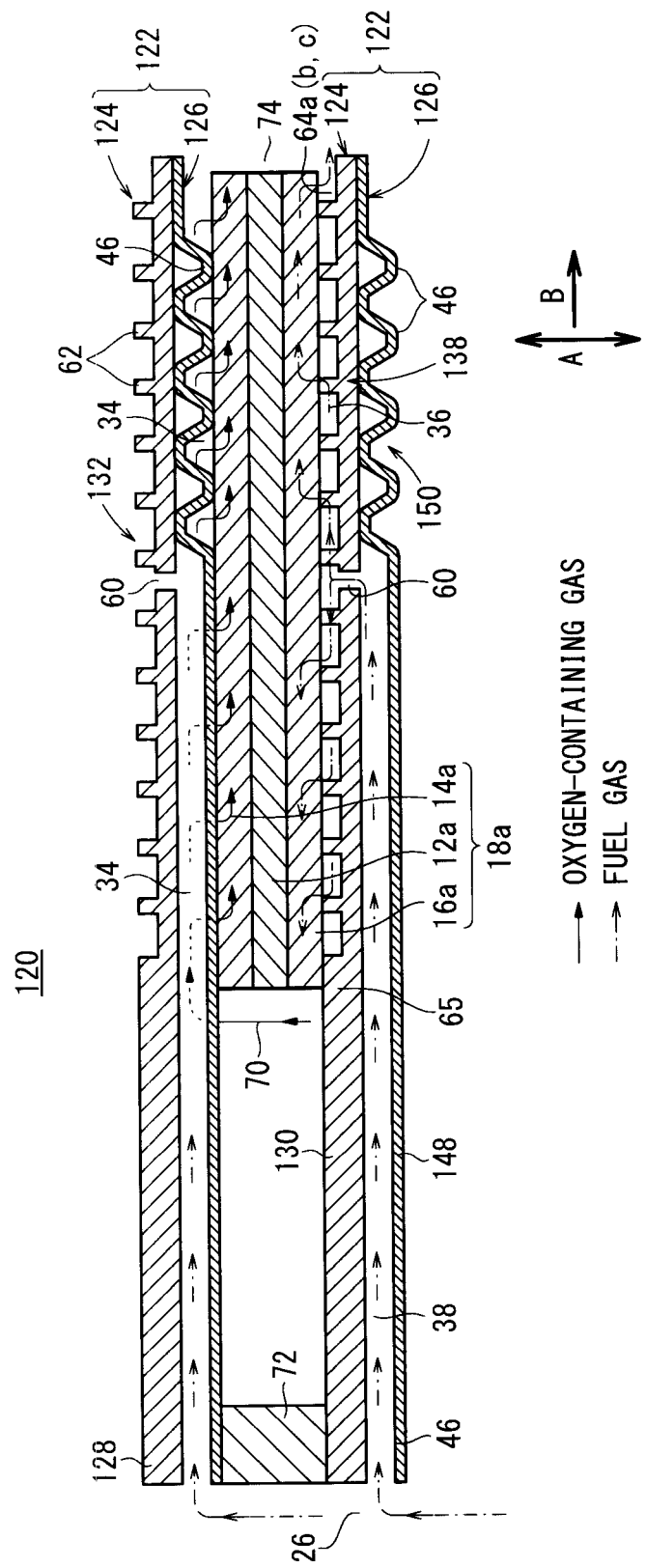
FIG. 10 is a cross sectional view schematically showing operation of the fuel cell.
Figure 11:
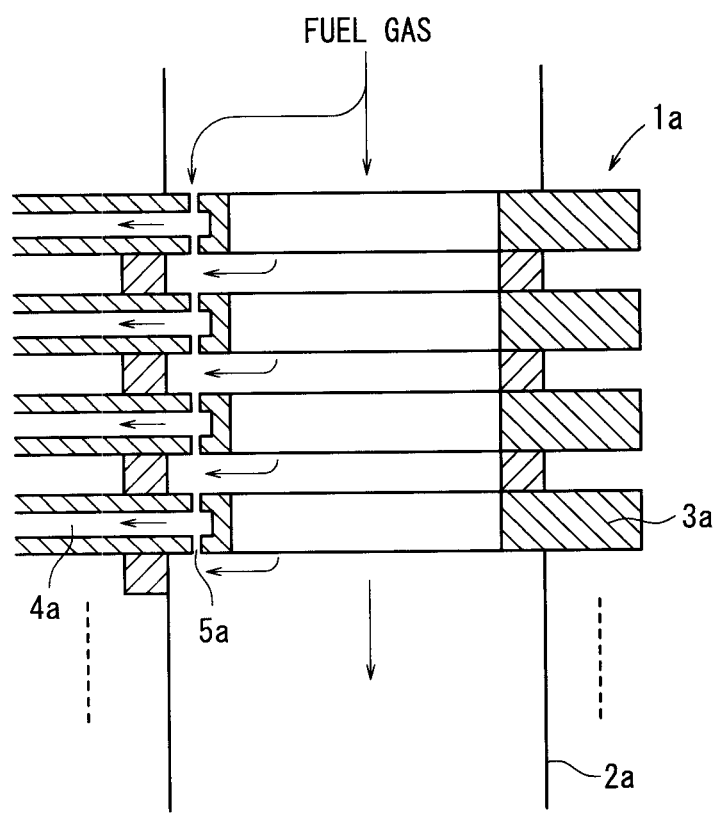
FIG. 11 is a view showing a solid oxide fuel cell disclosed in Japanese Laid-Open Patent Publication No. 2006-269409.
Figure 12:
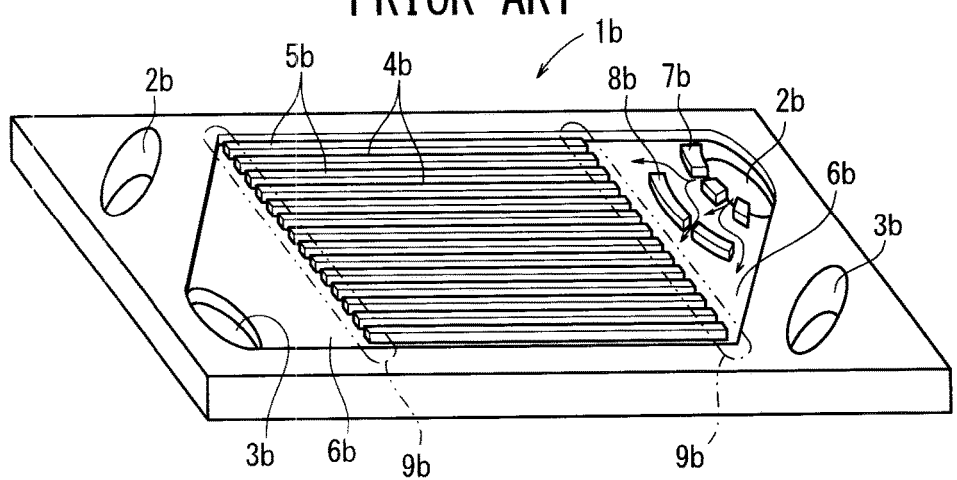
FIG. 12 is a perspective view schematically showing a separator disclosed in Japanese Laid-Open Patent Publication No. 10-172594.

As shown in FIG. 10, the oxygen-containing gas channel 34 is connected to the oxygen-containing gas supply passage 70 for supplying the oxygen-containing gas from a space between an inner circumferential edge of the electrolyte electrode assembly 18*a* and inner circumferential edges of the first and second circular disk sections 138, 150 in a direction indicated by an arrow B. The oxygen-containing gas supply passage 70 extends at the center side of the separator 122, i.e., between the first and second circular disk sections 138, 150 and the first and second elongated plate sections 136, 148 in the stacking direction indicated by the arrow A, to form an oxygen-containing gas supply section.

In the fuel cell 120, an exhaust gas discharge passage 74 is provided at the outer circumferential side of the separator 122 around the first and second circular disk sections 138, 150. The exhaust gas discharge passage 74 forms an exhaust gas discharge section for discharging the fuel gas and the oxygen-containing gas after partially consumed in the reaction in the electrolyte electrode assembly 18*a* as the exhaust gas in the stacking direction. As necessary, an air control plate 152 is provided between the first and second circular disk sections 138, 150.

In the fuel cell 120, the pressure losses P1, P4 in the entire four fuel gas inlets 60, the pressure losses P2, P5 in the entire four fuel gas supply channels 38, and the pressure losses P3, P6 in the entire fuel gas supply passage 26 have the relationships of P1>P2 and P1>P3 in the rated operation temperature range, and have the relationships of P4/P5>10 and P4/P6>10 in the normal temperature range during interruption of operation.

Thus, in the third embodiment, the same advantages as in the case of the first embodiment are obtained. For example, in the inspecting environment and the operating environment, the throttle position and the fuel gas inlet 60 can be provided at the same position, and inspection of the throttle position having the function of uniformly distributing the fuel gas can be performed easily and accurately.

Next, operation of the fuel cell 120 will be described. The fuel gas flows from the fuel gas supply passage 26 extending through the fuel gas supply section 128 of each separator 122 into the respective fuel gas supply channels 38 formed in the four bridges 130. Then, the fuel gas from the fuel gas supply channels 38 flows into the fuel gas inlets 60 of the sandwiching sections 132.

In the structure, the fuel gas is supplied from the fuel gas inlets 60 to the substantially central regions of the anodes 16*a*, and then, the fuel gas moves along the fuel gas channels 36 toward the outer region of the anodes 16*a*.

In the meanwhile, the air supplied to the oxygen-containing gas supply passage 70 flows into spaces between inner circumferential edges of the electrolyte electrode assemblies 18*a* and inner edges of the sandwiching sections 132 in the direction indicated by the arrow B, and the oxygen-containing gas is supplied to the oxygen-containing gas channel 34. In the oxygen-containing gas channel 34, the oxygen-containing gas flows from the inner circumferential edge (center of the separator 122) to the outer circumferential edge (outer circumferential edge of the separator 122) of the cathode 14*a* of the electrolyte electrode assembly 18*a*, i.e., from one end to the other end of the cathode 14*a* of the electrolyte electrode assembly 18*a*.

Thus, in each of the electrolyte electrode assemblies 18*a*, the fuel gas flows from the center to the outer circumferential side on the electrode surface of the anode 16*a*, and the oxygen-containing gas flows in one direction indicated by the arrow B on the electrode surface of the cathode 14*a*. At this time, oxygen ions flow through the electrolyte 12*a* toward the anode 16*a* for generating electricity by electro-chemical reactions.

While the invention has been particularly shown and described with reference to preferred embodiments, it will be understood that variations and modifications can be effected thereto by those skilled in the art without departing from the scope of the invention as defined by the appended claims.

The invention claimed is:

1. A control method of a fuel cell formed by stacking an electrolyte electrode assembly stacked between separators, the electrolyte electrode assembly including an anode, a cathode, and an electrolyte interposed between the anode and the cathode, the separators each including:
   a sandwiching section for sandwiching the electrolyte electrode assembly, the sandwiching section having a fuel gas channel for supplying a fuel gas along an electrode surface of the anode and a fuel gas inlet for supplying the fuel gas to the fuel gas channel;
   a bridge connected to the sandwiching section, a fuel gas supply channel being formed in the bridge for supplying the fuel gas to the fuel gas inlet; and
   a fuel gas supply section connected to the bridge, a fuel gas supply passage extending through the fuel gas supply section in a stacking direction for supplying the fuel gas to the fuel gas supply channel,
   wherein the method comprises:
   providing a throttle position where a pressure loss is greatest and the fuel gas inlet at a same position;
   setting the cross sectional area in an opening of the fuel gas inlet to be smaller than the cross sectional area in an opening of the fuel gas supply channel and the cross sectional area in an opening of the fuel gas supply passage, and setting the cross sectional area in the opening of the fuel gas inlet, the cross sectional area in the opening of the fuel gas supply channel, and the cross sectional area in the opening of the fuel gas supply passage are set such that:
   in a rated operation temperature range during rated operation of the fuel cell, a pressure loss P1 by the fuel gas supplied to the fuel gas inlet, a pressure loss P2 by the fuel gas supplied to the fuel gas supply channel, and a pressure loss P3 by the fuel gas supplied to the fuel gas supply passage have relationships of P1>P2 and P1>P3; and in a normal temperature range during interruption of operation of the fuel cell, a pressure loss P4 by an oxygen-containing gas supplied to the fuel gas inlet, a pressure loss P5 by the oxygen-containing gas supplied to the fuel gas supply channel, and a pressure loss P6 by the oxygen-containing gas supplied to the fuel gas supply passage have relationships of P4/P5>10 and P4/P6>10;

setting the volume of the fuel gas inlet, the volume of the fuel gas supply channel, and the volume of the fuel gas supply passage such that the pressure losses have the relationships of P1>P2 and P1>P3;

setting the volume of the fuel gas inlet, the volume of the fuel gas supply channel, and the volume of the fuel gas supply passage such that the pressure losses have the relationships of P4/P5>10 and P4/P6>10; and performing pressure loss inspection of the fuel cell in the normal temperature range by supplying oxygen-containing gas into the fuel gas inlet and measuring the total pressure loss P4+P5+P6.

2. The method according to claim 1, wherein the rated operation temperature range is a range of 600° C. to 800° C.

3. The method according to claim 1, wherein the normal temperature range is in a range of 10° C. to 30° C.

4. The method to claim 1, wherein the fuel cell is a solid oxide fuel cell.

5. The method according to claim 1, wherein the separators each further include:

a first plate and a second plate;

the first plate comprising a first circular disk section, a first elongated plate section formed integrally with the first circular disk section, and a first rectangular section formed integrally with the first elongated plate section and disposed in contact with the cathode;

the second plate comprising a second circular disk section, a second elongated plate section formed integrally with the second circular disk section, and a second rectangular section formed integrally with the first elongated plate section and disposed in contact with the anode; and the fuel gas inlet is formed in the second rectangular section of the second plate.

6. The method according to claim 1, wherein the separators each further include:

a first plate and a second plate;

the first plate comprising a first smaller diameter circular disk section, a first elongated plate section formed integrally with the first smaller diameter circular disk section, and a first larger diameter circular disk section formed integrally with the first elongated plate section and disposed in contact with the anode;

the second plate comprising a second smaller diameter circular disk section, a second elongated plate section formed integrally with the second smaller diameter circular disk section, and a second larger diameter circular disk section formed integrally with the second elongated plate section and disposed in contact with the cathode; and the fuel gas inlet is formed in the first larger diameter circular disk section of the first plate, wherein the first smaller diameter circular disk section has a diameter smaller than that of the first larger diameter circular disk section, and the second smaller diameter circular disk section has a diameter smaller than that of the second larger diameter circular disk section.

7. The method according to claim 5, further comprising a detour path forming wall provided on the second rectangular section, the fuel gas inlet being disposed in an area of the detour path forming wall.

8. The method according to claim 6, further comprising a detour path forming wall provided on the first larger diameter circular disk section, the fuel gas inlet being disposed in an inner area of the detour path forming wall.

* * * * *